United States Patent [19]
Uola

[11] Patent Number: 5,603,095
[45] Date of Patent: Feb. 11, 1997

[54] RADIO SYSTEM AND A SUBSCRIBER TERMINAL FOR A RADIO SYSTEM

[75] Inventor: Risto Uola, Oulu, Finland

[73] Assignee: Nokia Telecommunications Oy, Espoo, Finland

[21] Appl. No.: 436,468

[22] PCT Filed: Sep. 27, 1994

[86] PCT No.: PCT/FI94/00436

§ 371 Date: May 26, 1995

§ 102(e) Date: May 26, 1995

[87] PCT Pub. No.: WO95/09512

PCT Pub. Date: Apr. 6, 1995

[30] Foreign Application Priority Data

Sep. 27, 1993 [FI] Finland ................. 934232

[51] Int. Cl.⁶ ............... H04B 7/26; H04B 17/00
[52] U.S. Cl. .............. 455/67.1; 455/54.1; 455/67.7; 455/127; 455/343; 379/58; 340/539; 340/636
[58] Field of Search ................. 455/67.1, 67.7, 455/127, 343, 54.1, 33.1, 89, 88, 115; 379/58, 61; 340/531, 539, 636

[56] References Cited

U.S. PATENT DOCUMENTS 4,367,458  1/1983  Hackett ................. 340/531
5,142,563  8/1992  Nyuu et al. .
5,392,462  2/1995  Komaki ................. 379/61

FOREIGN PATENT DOCUMENTS 0542509  5/1993  European Pat. Off. .
0544635  6/1993  European Pat. Off. .

*Primary Examiner*—Chi H. Pham
*Attorney, Agent, or Firm*—Cushman Darby & Cushman IP Group of Pillsbury Madison & Sutro LLP

[57] ABSTRACT

A radio system providing a wireless local loop, including a fixed network having at least one exchange, at least one subscriber database and base stations, and subscriber terminals communicating with the fixed network via a radio path. Each subscriber terminal includes a radio transceiver, a power source with a battery backup unit, a measurer for measuring the signal level and signal quality on the radio path between a base station and the subscriber terminal, and a measurer for measuring the charge level of the battery backup unit of the power source. The subscriber terminal transmits the test results concerning at least one of the battery backup unit and the power supply to the fixed network in a predetermined report message at predetermined intervals or in response to a predetermined test result. The at least one subscriber database of the radio network maintains information about at least one of the charge levels of the batteries and failures in the power supply of the subscriber terminals, and about the signal level and signal quality measured by the subscriber terminal.

14 Claims, 2 Drawing Sheets

| Bit | 8 | 7 | 6 | 5 | 4 | 3 | 2 | 1 |
|---|---|---|---|---|---|---|---|---|
| A | 0 | 0 | 0 | 0 | 0 | 1 | 0 | 1 |
| B | 0 | X | 1 | 1 | 0 | 0 | 1 | 0 |
| C | Length ||||||||
| D | 0 | 0 | C1 low ||||||
| E | 0 | 0 | DSC low ||||||
| F | Length ||||||||
| G | Alarm status ||||||||
| H | Charge level ||||||||

RADIO SYSTEM AND A SUBSCRIBER TERMINAL FOR A RADIO SYSTEM

FIELD OF THE INVENTION

The invention relates to a radio system providing a wireless local loop, the system comprising a fixed network including at least one exchange, at least one subscriber database and base stations, and subscriber terminals communicating with the fixed network via a radio path, each subscriber terminal comprising a radio transceiver, a power source with a battery backup unit, means for measuring the signal level and signal quality on the radio path between a base station and the subscriber terminal, and means for measuring the charge level of the battery backup unit of the power source.

BACKGROUND OF THE INVENTION

The most expensive and the most time-consuming part in setting up conventional cable-based telecommunication networks is cabling, which connects each subscriber to the local exchange. In many cases it is preferable to replace fixed subscriber cables with a radio connection which can be established easily and quickly to connect the subscribers to the public switched telephone network (PSTN) in areas where no subscriber lines are available and it is too expensive, too slow or otherwise impractical to install them. Thus the subscriber network comprises, in the same way as a normal mobile telephone network, base stations connected to the exchange, the subscriber terminals (mobile telephones) having a radio connection with the base stations. Such a system is called a wireless local loop (WLL). Since a WLL radio system is generally an extension of the normal public switched telephone network, it typically uses the normal numbering of a phone network. Alternatively, it is possible to use the numbering of a mobile telephone network. A call to the phone number of a WLL subscriber generally causes the routing of the call always to one and the same exchange and base station connected to it, the base station paging the subscriber via a radio path. It is possible to connect any conventional telephone set to the WLL radio system, and thus the radio path is invisible to the user and provides, through the base station, a point-to-point connection between the WLL telephone set and the exchange.

The WLL network operator is usually responsible for the equipment at both ends of the radio path. The base station equipment is connected directly to the network and thus it is relatively easy to monitor. However, the operator should also be able to monitor the subscriber terminal at the other end of the radio path. If the level or quality of the signal received by the subscriber terminal is too low, the quality of the call is poor or calls to the subscriber terminal will be completely prevented. This corresponds to a poor or a disconnected subscriber line in a fixed network. In addition, in WLL applications the operator cannot provide power supply for the subscriber terminal through the subscriber line as in a cabled phone network, but the power supply has to be organized locally in the location of the subscriber terminal. This means that the subscriber terminal has to be provided with a battery backup unit to ensure the connection in all situations, for example during a power failure. Therefore, it should be possible to monitor also the power supply of the subscriber terminal, the charge level of the battery backup unit and preferably also any malfunctions related to the supply of charging current.

Mobile telephones for conventional mobile telephone networks conduct, in an idle state, some kind of measurements on the received signal level and quality of the radio channel. A typical mobile telephone also measures the charge level of the battery. These measurements are conducted, however, only for the user of the mobile telephone, who is responsible for the condition of his own mobile telephone in a conventional mobile phone network. The measured information is shown to the user on the display of the mobile telephone, and if some failure is detected, the user is alarmed. U.S. Pat. No. 5,142,563 discloses a similar application, where the portable part of a wireless telephone monitors the voltage level of its battery power source, and when the voltage level drops, sends a signal to the fixed part, the so-called base station, of the wireless telephone, the signal directing the base station to a quick-charging state to wait for the wireless telephone to be positioned on the charging device of the base station. The base station is meant to be connected to a normal subscriber line of a wired telephone network. The operator of a conventional mobile telephone network or a fixed network is not responsible, however, for the working condition of the wireless terminal equipment or the mobile telephone of the subscriber, but, instead, what is provided is only a local indication about the condition of the terminal equipment, given to the user or intended for the internal use of the terminal equipment. Such a local indication is not suitable, however, for the operator of a WLL network, since its utilization would require repeated visits to the mobile telephone or the wireless telephone, and would thus be extremely difficult and would mean long intervals between the checks. The operator of a WLL network needs such information centralized in one place, so that the operator could control the accessibility of the network and the need for maintenance.

SUMMARY OF THE INVENTION

The object of the invention is a radio system providing a wireless local loop and collecting the aforementioned information.

This object is achieved by means of a radio system similar to the one described in the introductory paragraph, the system being characterized according to the invention in that the subscriber terminal transmits the test results concerning the battery backup unit and/or the state of the power supply to the fixed network in a predetermined report message at predetermined intervals or in response to a predetermined test result, and that the at least one subscriber database of the radio network maintains information about the state of the power supply of the subscriber terminals and/or the charge levels of the batteries, and about the signal level and signal quality measured by the subscriber terminal.

According to the invention, the subscriber terminal reports the test results concerning the power supply and/or the battery backup unit and the level and quality of the received signal to the network in a special test report message. This message can be transmitted whenever a signalling connection is established, at suitable intervals and in special situations. The test report messages are used for updating the subscriber database of the fixed network, the database containing information about the state of the power supply of the subscriber terminals and/or the charge levels of the battery backup units and about the signal level and quality measured by the subscriber terminal in order to detect malfunctions concerning the battery backup unit. If, for example, reports about a break in the charging current of the battery backup unit are desired from subscriber terminals, the invention provides a method which prevents overloading of the network as a result of a general power failure, but which ensures transmission of the desired information about an individual break in the charging current before the battery backup unit will be used up.

The combined processing of information concerning both the battery backup unit and the quality of the connection can provide, in some situations, essential information in a WLL system. Such a situation may occur, for example, when power supply is provided by different methods at different times, for example by an aggregate and by solar cells. Equipment malfunctions possibly caused by an individual method are discovered, if the reports giving information about the bad quality of a connection always include a part identifying the specific power supply method.

The test results can be sent to the fixed network at predetermined intervals under the control of a timer. The timer is preferably a periodic location updating timer, and the test report message is always transmitted during this procedure. In a WLL network, where the subscriber terminals are positioned in fixed locations, it is not necessary to use any kind of periodic location updating procedure; however, it is advantageous to utilize this procedure for the control procedure according to the invention. Thus, it is possible to exploit, with slight modifications, the location updating characteristics provided in the present subscriber terminals and radio networks. The network operator can control the interval between two successive test report messages in an idle state by means of a periodic location updating timer arrangement.

In addition to periodic reporting, test report messages can be transmitted in response to predetermined test results. If the status of the battery changes during a call, the test report message is transmitted immediately. If the status changes or the radio path measurements indicate faulty conditions in an idle state, the test report message is transmitted when the next signalling connection is established. The subscriber terminal which indicates a failure in the battery can also start the location updating procedure to inform the network about the failure.

BRIEF DESCRIPTION OF THE DRAWINGS

The invention will be described by means of illustrative embodiments, with reference to the accompanying drawings, in which.

PREFERRED EMBODIMENTS OF THE INVENTION

Figure 1:
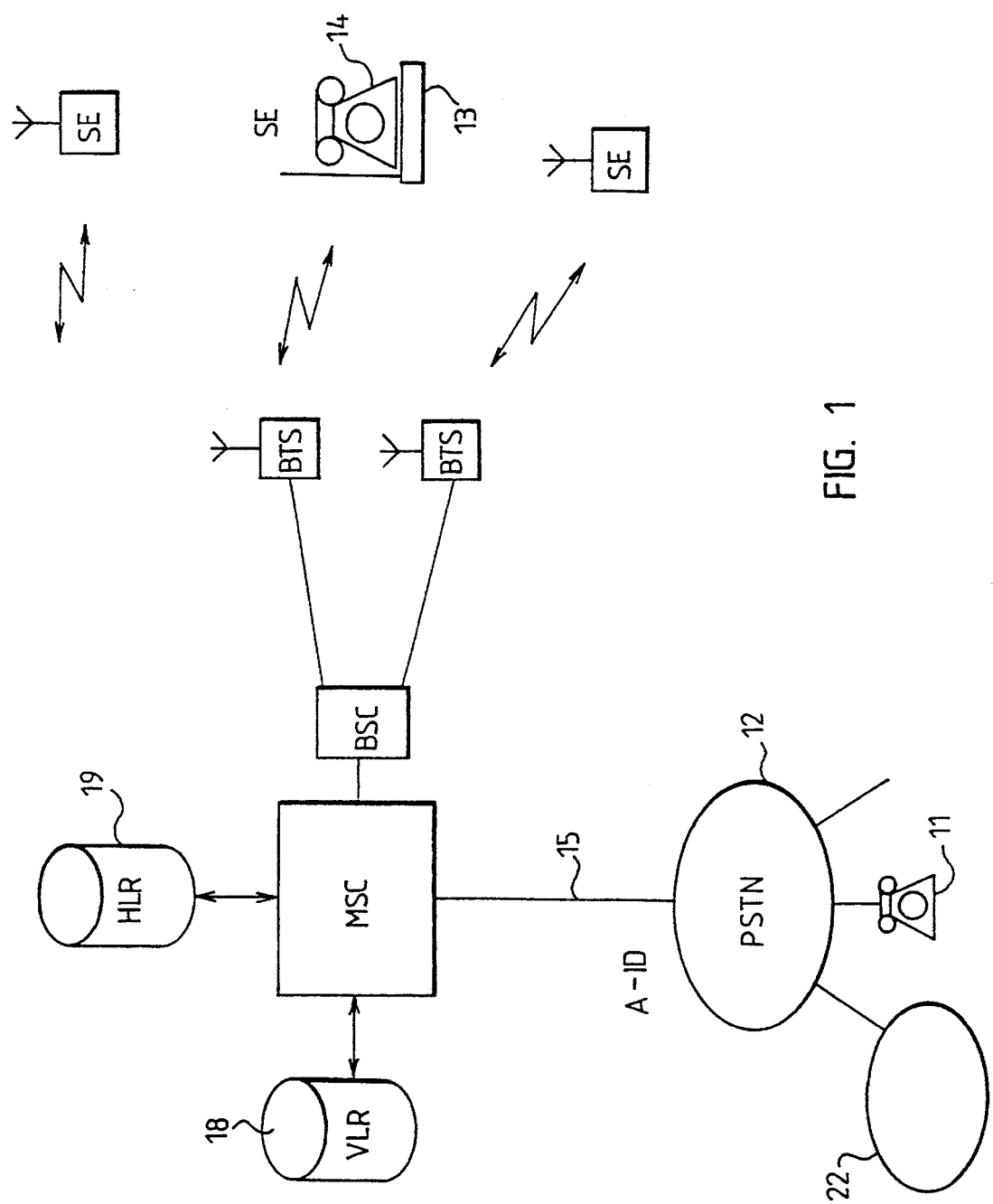
FIG. 1 represents a radio system according to the invention.

The present invention can be applied in any radio system which is used as a wireless local loop (WLL) to replace the cabled subscriber lines between a fixed network and the subscribers. FIG. 1 shows a general view of one cellular radio system, according to the invention, which is based on the utilization of known radio networks, such as the GSM. A WLL network can even be realized as part of a conventional mobile telephone network, in which case there are both WLL subscribers and mobile telephone subscribers in the same network. In the following, the invention will be explained by using as an example the application of a WLL network in the Pan-European mobile phone network GSM, without restricting the invention, however, thereto.

The radio system shown in FIG. 1 comprises an exchange MSC, a base station controller BSC, a number of base stations BTS and a large number of subscriber terminals SE. In the same way as a conventional mobile exchange, the exchange MSC comprises a switch for connecting calls, and a call control computer, which controls all signalling between the subscriber terminals and the radio network when a call is established, during the call and when it is ended, and which allocates radio channels for the calls, for the radio connections between a base station BTS and subscriber terminals SE. The exchange MSC of the radio system also has a connection 15 to a public switched telephone network PSTN 12 and, through that, to PSTN subscribers 11 or to other networks 22 and their subscribers.

The base station BTS can also be realized in the same way as a base station of a conventional mobile telephone system, but its basic units are naturally a set of transceivers, the exact number of which is determined by the traffic capacity requirements.

A WLL subscriber terminal SE typically comprises a mobile telephone unit 13 and a conventional telephone set 14. The mobile telephone unit operates as an interface unit to the radio path and provides the user with a normal subscriber line, to which the user can connect his conventional telephone set 14. However, the subscriber terminal can also be a portable mobile telephone, as will be explained below in connection with FIG. 2.

In WLL radio systems, the exchange MSC makes a fixed association between the telephone number of a subscriber terminal and a subscriber terminal SE located in the location area formed by one particular base station BTS or by several base stations. When there is a call to the telephone number, the exchange MSC starts paging for the subscriber terminal in the area of the base station BTS indicated by the telephone number or in the location area containing several base stations. Since the location of the subscriber is assumed to be fairly permanent, mobility management functions and location updating are not necessarily needed in the radio system. However, there is at least one subscriber database in the radio system, for example a visitor location register VLR associated with the exchange MSC, the VLR maintaining information about the subscribers in the area of the exchange, or a home location register HLR, where information about the subscribers in the entire network is centralized.

Figures 2, 3:
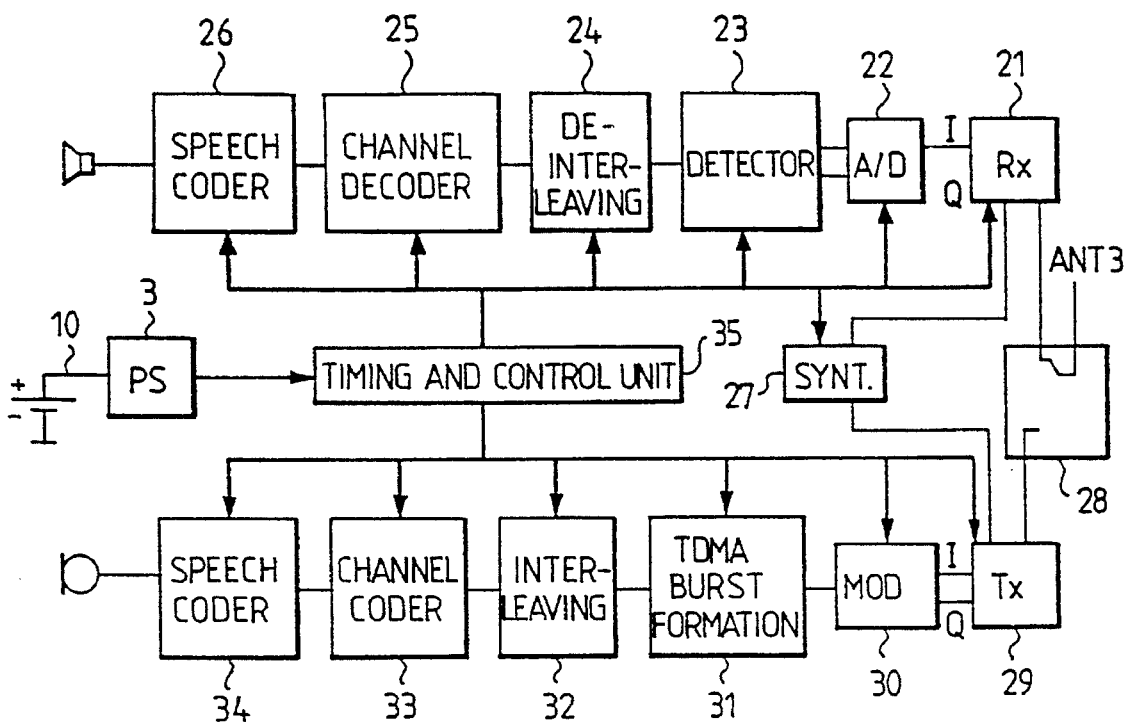
FIG. 2 is a block diagram of a subscriber terminal according to the invention.
FIG. 3 represents a test report message applicable in the GSM system.

FIG. 2 shows a mobile telephone applicable as a subscriber terminal SE according to the invention. The SE comprises an antenna 3, a duplex filter 28, a receiver 21, a transmitter 29 and a synthesizer 27. In the receiving direction, an A/D converter 22, a detector 23, a de-interleaver 24, a channel decoder 25, a speech coder 26 and a loudspeaker are connected in series with the receiver 21. In the transmitting direction, a modulator 30, TDMA burst formation 31, an interleaver 32, a channel coder 33, a speech coder 34 and a microphone are connected in series in front of the transmitter. All the aforementioned blocks are controlled by a timing and control unit 35, which handles all outbound and inbound messages. The power source 3 forms the operating voltage $V_{cc}$ for the entire subscriber terminal from an external power source, such as supply voltage provided by the mains (i.e., electrical utility service line voltage) a solar cell or an aggregate, or from the voltage of a battery 10 operating as a backup power source. The power source 3 also operates as the charging device for the battery 10 when the external power source is connected. The power source 3 continuously measures the charge level of the battery 10, its charging current and/or the state of an external power source 2, and reports the test result to the control unit 35. The receiver 21 measures the level of the signal received from the base station through the radio path and reports the test results to the control unit 35. The channel decoder 25 measures the signal quality of the control channel of the base station by means of, for example, the number of lost information blocks and reports the test result to the control unit 35. The control unit 35 collects and analyzes the test results. The control unit 35 can possibly show the test results for the user on the display (not shown in the Figure) of the subscriber terminal, and if some failure or malfunction is detected, it can alarm the user.

According to the invention, the subscriber terminal reports the test results to the fixed network in a special message, hereafter called a test report message. This message can be transmitted whenever a signalling connection is established between a subscriber terminal and the base station. If the control unit 35 detects a change in the status of the battery 10, a break in the charging current of the battery and/or a failure in the external power supply during a call, it immediately generates and transmits a test report message. If the status of the battery changes, its charging current breaks and/or if there is a failure in the external power supply or if the measurements on the radio path indicate a malfunction when the subscriber terminal is in an idle state, the control unit 35 generates and transmits a test report message when the next signalling connection is established. Under normal circumstances, the subscriber terminal transmits the test results to the fixed network at predetermined intervals. For this purpose, the control unit 35 of the subscriber terminal comprises a special timer; expiring of the timer initiates transmission of a new test report message. This timer is preferably a periodic location updating timer of a subscriber terminal, in which case a test report is always transmitted during a location updating procedure, when the timer reaches the predetermined time. A WLL network, where the subscriber terminals are in fixed locations, does not necessarily require the use of any kind of periodic location updating procedure, but the functions of this procedure can be used for the reporting according to the invention.

The base station BTS receives the test report messages transmitted by the subscriber terminal SE and forwards them to the exchange MSC, which forwards the test results to the subscriber database of the network, for example to a visitor location register VLR. The visitor location register VLR maintains information about the charge levels of the batteries of the subscriber terminals, the status of their charging current and/or failures in the external power supply, and about the signal level and signal quality measured by the subscriber terminal. This information can be maintained advantageously by the same mechanism as the location data of a normal mobile telephone subscriber. Advantageously, the test results can also be forwarded to the operation and maintenance center OMC of the radio network. The VLR also comprises a timer, preferably a periodic location updating timer, which controls the time that elapses in an idle state between two successive test report messages transmitted by the subscriber terminal. If no test report message is received within a predetermined time after the previous report message, the VLR assumes that there is a failure in the subscriber terminal or it is disconnected.

FIG. 3 represents a test report message applicable in the GSM system. The information elements of the message, beginning from the first line, are:

line A: transaction identifier and protocol discriminator;

lines C, D, E: test results of the radio path; in line C the length of the information element (Length), in line D the lowest received power level during a test period (C1 low), in line E the lowest value describing the signal quality (e.g., Downlink signalling radio counter DSC) during a test period (DSC low);

lines F, G and H contain the test results concerning the battery unit. Line F contains the length of the information element (Length); line G, the status of the battery (Alarm status); line H, the current charge level of the battery (Charge level).

The figures and the description related thereto are only meant to illustrate the present invention. The details of the radio system and subscriber terminal according to the invention can vary within the scope of the appended claims.

I claim:

1. A radio system providing a wireless local loop, said system comprising:

a fixed network including
at least one exchange,
at least one subscriber database, and
base stations, and subscriber terminals communicating with the fixed network via a radio path, each subscriber terminal comprising a radio transceiver, a power source connected to an external power supply, a battery backup unit for the power source, means for measuring and providing test results concerning the signal level and signal quality on the radio path between a base station and the subscriber terminal, and means for measuring and providing test results concerning the charge level of the battery backup unit of the power source, each subscriber terminal being arranged to transmit the test results concerning at least one of the battery backup unit and the state of the power supply, to the fixed network, in a predetermined report message at predetermined intervals or in response to a predetermined test result, said at least one subscriber database of the radio network being arranged to maintain information about at least one of the charge level of the battery backup unit and the state of the external power supply, and abut the signal level and signal quality measured by each respective subscriber terminal.

2. A radio system according to claim 1, wherein:

each subscriber terminal comprises a timer device which is arranged to initiate transmission of said test results to said fixed network at predetermined intervals.

3. A radio system according to claim 2, wherein:

said fixed network comprises a timer device which is arranged to measure the interval between successive transmissions of report messages from each respective subscriber terminal.

4. A radio system according to claim 2, wherein:

said timer device is a periodic location updating timer, and each subscriber terminal is arranged to transmit said report message during the location updating procedure.

5. A radio system according to claim 3, wherein:

said timer device is a periodic location updating timer, and each subscriber terminal is arranged to transmit said report message during the location updating procedure.

6. A radio system according to claim 1, wherein:

each said subscriber terminal comprises means for assessing the test results and for transmitting the test results to the fixed network immediately after a respective next signalling connection has been established, if the respective test results show an essential change in the charge level of the respective battery backup unit, at least one of a break in its charging current and a failure in the respective external power supply, or a change in the condition of the respective radio path.

7. A radio system according to claim 1, wherein:

each subscriber terminal is arranged to cause each report message to contain the lowest signal level measured by the respective said measuring means during a respective test period, the lowest signal quality measured by the respective said measuring means during the respective test period and the current charge level of the respective battery backup unit.

8. A radio system according to claim 1, wherein:

said external power supply includes mains voltage, a solar cell, or an aggregate of mains voltage and a solar cell.

9. A subscriber terminal for a radio system providing a wireless local loop, the system comprising a fixed network including at least one exchange, at least one subscriber database and base stations, said subscriber terminal communicating via a radio path with the fixed network and comprising:

a radio transceiver, a power source connected to an external power supply, a battery backup unit for said power source, means for measuring the signal level and signal quality on the radio path between a respective one of said base stations and said subscriber terminal, and means for measuring the charge level of said battery backup unit, the subscriber terminal being arranged to transmit test results concerning at least one of said battery backup unit and said external power supply, to said fixed network, in a predetermined report message at predetermined intervals, or in response to a predetermined test result.

10. A subscriber terminal according to claim 9, further comprising:

a timer device which initiates transmission of said test results to said fixed network at predetermined intervals.

11. A subscriber terminal according to claim 10, wherein:

said timer device is a periodic location updating timer, and that said subscriber is arranged to transmit said report message during a location updating procedure.

12. A subscriber terminal according to claim 9, further comprising:

means for assessing the test results and for transmitting the test results to said fixed network immediately if the test results show an essential change in the charge level of the battery backup unit or in the condition of the radio path.

13. A subscriber terminal according to claim 9, wherein the report message contains the lowest signal level measured during a respective test period, the lowest signal quality measured during the respective test period, and the current charge level of the battery backup unit.

14. A subscriber terminal according to claim 8, wherein:

said external power supply includes mains voltage, a solar cell, or an aggregate of mains voltage and a solar cell.

\* \* \* \* \*